United States Patent
Nobuoka et al.

(10) Patent No.: US 10,674,054 B2
(45) Date of Patent: *Jun. 2, 2020

(54) IMAGE PROCESSING APPARATUS AND IMAGE PROCESSING METHOD

(71) Applicant: TOSHIBA TEC KABUSHIKI KAISHA, Tokyo (JP)

(72) Inventors: Tetsuya Nobuoka, Sunto Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 15/331,201

(22) Filed: Oct. 21, 2016

(65) Prior Publication Data

US 2018/0115690 A1   Apr. 26, 2018

(51) Int. Cl.
  *H04N 5/225* (2006.01)
  *H04N 5/33* (2006.01)
  *G06T 7/00* (2017.01)
  *G06K 9/00* (2006.01)
  *G06K 9/62* (2006.01)
  *G06Q 20/20* (2012.01)
  *G06T 7/11* (2017.01)
  *G07G 1/00* (2006.01)

(52) U.S. Cl.
  CPC ....... *H04N 5/2256* (2013.01); *G06K 9/00201* (2013.01); *G06K 9/00671* (2013.01); *G06K 9/6215* (2013.01); *G06Q 20/208* (2013.01); *G06T 7/11* (2017.01); *G07G 1/0063* (2013.01); *G06K 2209/401* (2013.01); *G06T 2207/10048* (2013.01)

(58) Field of Classification Search
  CPC .... H04N 5/2256; H04N 5/33; G06K 9/00201; G06K 9/00671; G06K 9/6215; G06K 2209/401; G06Q 20/208; G06T 7/0081; G06T 2207/10048
  USPC ........................................................ 348/150
  See application file for complete search history.

(56) References Cited

U.S. PATENT DOCUMENTS

2014/0351073 A1 * 11/2014 Murphy ................. G06Q 10/00
                                                                705/23
2016/0379076 A1 * 12/2016 Nobuoka ................. G06K 9/46
                                                                382/103

FOREIGN PATENT DOCUMENTS

WO    2015/140855   9/2015

* cited by examiner

*Primary Examiner* — Hee-Yong Kim
(74) *Attorney, Agent, or Firm* — Kim & Stewart LLP

(57) ABSTRACT

According to one embodiment, an image processing apparatus comprises a screen, a camera, a distance sensor, and a processor. The screen has one surface where an object is put. The camera photographs an image from the other surface of the screen. The distance sensor measures a distance from the one surface of the screen and generates distance information indicating the distance. The processor extracts a region of the object from the photographed image, specifies the object from the image of the region of the object, acquires an outer dimension preset to the specified object, calculates a length, from the screen, of the object put on the one surface of the screen based on the distance information, and outputs an alert when the outer dimension does not match the length of the object.

18 Claims, 7 Drawing Sheets

IMAGE PROCESSING APPARATUS AND IMAGE PROCESSING METHOD

FIELD

Embodiments described herein relate generally to an image processing apparatus and an image processing method.

BACKGROUND

Among settlement apparatuses, there is a settlement apparatus including an image processing apparatus that recognizes a commodity in accordance with an image obtained by photographing, from below, the commodity disposed on a screen, whereby commodity settlement is performed based on recognition results. The image processing apparatus specifies, from the image, a commodity region where the commodity is present, and reads a barcode or the like from the commodity region to recognize the commodity.

Heretofore, when commodities are stacked, the image processing apparatus has the problem that failure in recognition of the commodities cannot be judged.

SUMMARY

To solve the above-mentioned problem, the exemplary embodiments provide an image processing apparatus and an image processing method which enable the judgement of failure in recognition of objects when the objects are stacked.

According to embodiments, an image processing apparatus comprises a screen, a camera, a distance sensor, and a processor. On the screen, an object is disposed on one surface of the screen. The camera photographs an image from the other surface of the screen to obtain a photographed image. The distance sensor measures a distance from the one surface of the screen and generates distance information indicating the distance. The processor extracts a region of the object from the photographed image, specifies the object from the image of the region of the object, acquires an outer dimension preset to the specified object, calculates a height, from the screen, of the object disposed on the one surface of the screen based on the distance information, and outputs an alert when the outer dimension does not match the length of the object.

DETAILED DESCRIPTION

In general, according to one embodiment, an image processing apparatus comprises a screen, a camera, a distance sensor, and a processor. The screen has one surface where an object is put. The camera photographs an image as a photographed image from the other surface of the screen. The distance sensor measures a distance from the one surface of the screen and generates distance information indicating the distance. The processor extracts a region of the object from the photographed image, specifies the object from the image of the region of the object, acquires an outer dimension preset to the specified object, calculates a length, from the screen, of the object put on the one surface of the screen based on the distance information, and outputs an alert when the outer dimension does not match the length of the object.

Hereinafter, embodiments will be described with reference to the drawings.

(First Embodiment)

First, a settlement apparatus (an image processing apparatus) according to a first embodiment will be described.

Figure 1:
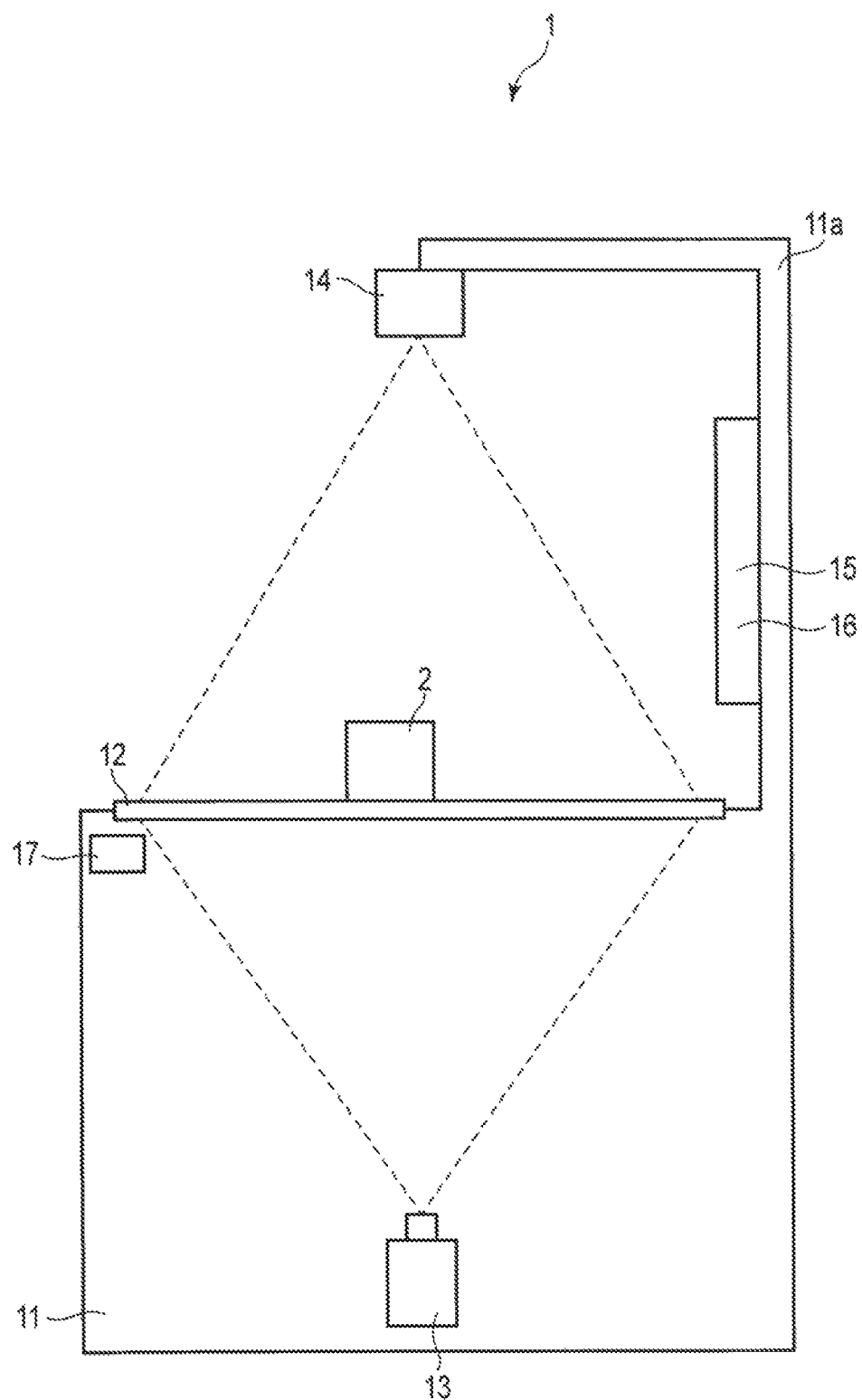
FIG. 1 is a view schematically illustrating a constitutional example of a settlement apparatus according to a first embodiment.

FIG. 1 schematically illustrates a constitutional example of a settlement apparatus 1 according to the first embodiment.

The settlement apparatus 1 performs settlement processing for a commodity 2 on a screen 12. The settlement apparatus 1 is installed in a store or the like that sells commodities. For example, upon accepting a predetermined operation, the settlement apparatus 1 executes the settlement processing for the commodity on the screen 12. The settlement apparatus 1 may be installed as a self-register for a user to perform the settlement processing by oneself. Alternatively, the settlement apparatus 1 may be installed as a usual register for the settlement processing by a shop clerk.

As shown in FIG. 1, the settlement apparatus 1 comprises a case 11, the screen 12, a camera 13, a distance sensor 14, a display 15, an operating section 16, a card reader 17, and others.

The case 11 is a frame forming an outer shape of the settlement apparatus 1. The case 11 holds the screen 12, the camera 13, and others.

The case 11 includes a support pillar 11a. The support pillar 11a extends vertically upwardly and extends horizontally from a predetermined position. A tip of the support pillar 11a is formed above the screen 12. The support pillar 11a holds the distance sensor 14, the display 15 and the operating section 16.

The screen 12 is disposed on an upper surface of the case 11. The screen 12 is constituted of a member that transmits illumination light. For example, the screen 12 is made of transparent or translucent glass or plastic, or the like. The screen 12 is a base on which the commodity 2 of a settlement object is put. That is, the screen 12 is a predetermined region in which the commodity 2 as the settlement object is set. The commodity 2 is put on the upper surface (one surface) of the screen 12 so that a surface to be photographed is downward. That is, the commodity 2 is set on the screen 12 so that the surface to be photographed faces the screen 12. The commodity 2 set on the screen 12, with the surface to be photographed being downward, becomes a state where the surface to be photographed can be photographed from the downside (the other surface) of the screen 12.

The camera 13 is disposed under the screen 12 to face upward. The camera 13 photographs an image of a photographing region on the screen 12 (the image when the other surface of the screen 12 is the photographing region) from the downside of the screen 12. The camera 13 photographs the image including the surface to be photographed of the commodity 2 put on the screen 12. Alternatively, the camera 13 may photograph an image with invisible light such as a near infrared ray.

Furthermore, the camera 13 focuses on the vicinity of the upper surface of the screen 12 (the surface that comes in contact with at least a part of the commodity 2 put on the screen 12). Consequently, the camera 13 can perform photographing in a state where the camera 13 focuses on the surface to be photographed of the commodity 2 which at least comes in contact with the upper surface of the screen 12. For example, even when the commodities are put on the screen 12, the surfaces to be photographed of the respective commodities come close to the upper surface of the screen 12, regardless of a shape of each commodity. Thus, the camera 13 focusing on the upper surface of the screen 12 can easily photograph the images (the images of the commodities) in the state where the surface to be photographed of each commodity which is focused.

The distance sensor 14 is downward disposed above the screen 12. For example, the distance sensor 14 is disposed to face a position of the camera 13 via a center of the screen 12. For example, the distance sensor 14 is disposed on a line extending at a right angle to the screen 12 from the camera 13. In the example shown in FIG. 1, the distance sensor 14 is disposed at the tip of the support pillar 11a.

The distance sensor 14 measures a distance from a reference point or a reference plane (e.g., the distance from the distance sensor 14 or the distance from a plane horizontal to the distance sensor 14). For example, the distance sensor 14 measures distances from the reference point or the reference plane to the commodity 2 and the screen 12.

The distance sensor 14 generates distance information indicating a distance from the reference point or the reference plane at each portion on the screen 12. The distance information indicates the distance to the screen 12 or the distance to the commodity 2. For example, the distance information may be a distance image that differs in color in accordance with the distance.

The distance sensor 14 measures the distance with, for example, reflected light of light (visible light or invisible light) emitted from a light source. For example, the distance sensor 14 may perform a ToF (time of flight) system to measure the distance from a measurement object based on a time until the emitted light is reflected by the measurement object and reaches the distance sensor 14. It is to be noted that a method of measuring the distance by the distance sensor 14 is not limited to a specific method.

Alternatively, the settlement apparatus 1 may include the distance sensors.

The display 15 is a display device that displays an image output by an after-mentioned CPU 21. The display 15 is, for example, a liquid crystal monitor or the like.

Into the operating section 16, various operating instructions are input by a user of the settlement apparatus 1. The operating section 16 transmits, to the CPU 21, data of the operating instructions input by an operator. The operating section 16 is, for example, a keyboard, ten keys, or a touch panel. Furthermore, the operating section 16 may accept an input of a gesture from the user.

Here, the operating section 16 is the touch panel, and is formed integrally with the display 15.

The card reader 17 acquires various pieces of information from a card which the user has. For example, the card reader 17 transmits and receives data to and from an IC chip in a contact or non-contact manner. Alternatively, the card reader 17 may be a type which reads magnetic information from the card.

For example, the card reader 17 acquires credit information, SF (stored fare) information or the like from the card which the user has.

It is to be noted that the card reader 17 may be a type which writes the data in the card.

Next, a constitutional example of a control system of the settlement apparatus 1 will be described.

Figure 2:
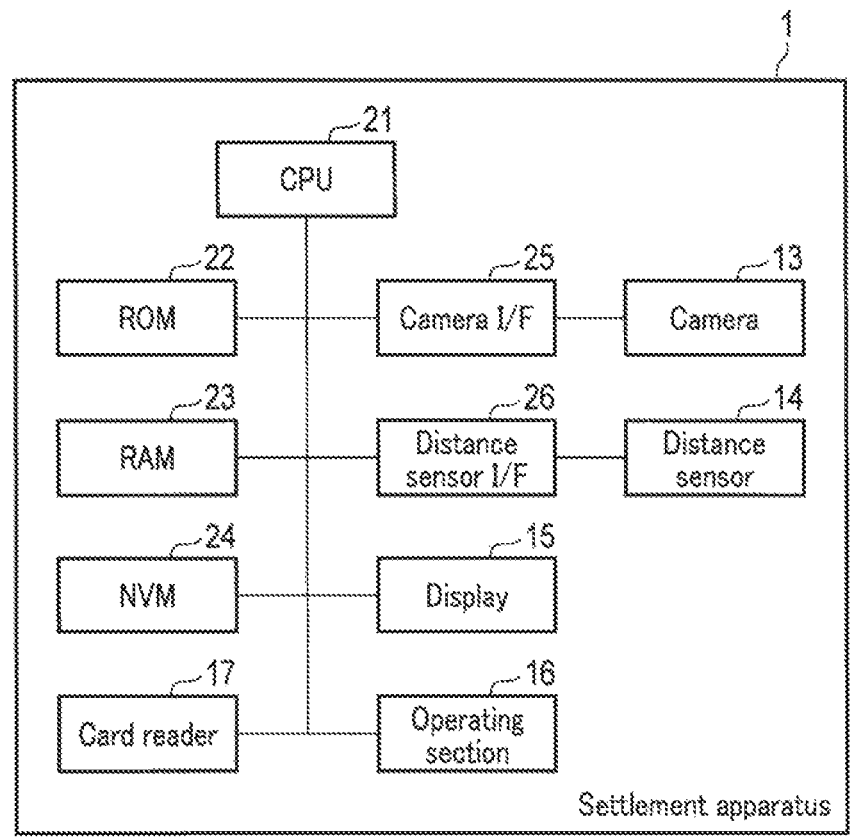
FIG. 2 is a block diagram illustrating the constitutional example of the settlement apparatus according to the first embodiment.

FIG. 2 is a block diagram showing the constitutional example of the control system of the settlement apparatus 1.

As shown in FIG. 2, the settlement apparatus 1 comprises the camera 13, the distance sensor 14, the display 15, the operating section 16, the CPU 21, a ROM 22, a RAM 23, an NVM 24, a camera interface 25, a distance sensor interface 26, and others. The respective components are connected to one another via data buses. It is to be noted that the settlement apparatus 1 may include other necessary constituents in addition to the constitution shown in FIG. 2, or may omit specific constituents.

The camera 13, the distance sensor 14, the display 15 and the operating section 16 are described above.

The CPU 21 has a function of controlling all the operations in the settlement apparatus 1. The CPU 21 may include an internal cache, various interfaces, and others. The CPU 21 executes a program beforehand stored in an internal memory, the NVM 24 or the like to realize various types of processing. The CPU 21 is, for example, a processor.

It is to be noted that a part of various functions realized by executing the program with the CPU 21 may be realized by a hardware circuit. In this case, the CPU 21 controls the function executed by the hardware circuit.

The ROM 22 is a nonvolatile memory that beforehand stores a control program, control data, and others. The ROM 22 is incorporated in the settlement apparatus 1 in a state of storing the control program, the control data, and others in a manufacturing stage. That is, the control program and the control data stored in the ROM 22 are beforehand incorporated in accordance with specifications of the settlement apparatus 1.

The RAM 23 is a volatile memory. The RAM 23 temporarily stores data or the like which is being processed by the CPU 21. The RAM 23 stores various application programs based on commands from the CPU 21. Furthermore, the RAM 23 may store data required for execution of the application program, execution results of the application program, and others.

The NVM 24 (a storing section) is constituted of a nonvolatile memory such as EEPROM (registered trademark) or flash ROM in which the data is writable and rewritable. The NVM 24 stores the control program, applications and various pieces of data in accordance with an application use of the settlement apparatus 1. For example, in the NVM 24, program files, data files, and others are prepared. In each of the prepared files, the control program, various pieces of data, and others are written.

The NVM 24 stores commodity information. The commodity information is information regarding the commodities. As the commodity information, commodity codes and outer dimensions of the commodities are associated and stored.

Each commodity code is information to specify the commodity. For example, the commodity code is a numeral, a character, a symbol or a combination of them.

The outer dimension of the commodity is a height from a predetermined surface of the commodity. For example, the commodity information includes a height from a surface on which a barcode is printed, as the outer dimension of the commodity. Furthermore, the commodity information may include a height from each surface as the outer dimension of the commodity.

It is to be noted that the commodity information may further include a commodity name, a price and the like. A constitution of the commodity information is not limited to a specific constitution.

The camera interface 25 is an interface via which the CPU 21 communicates with the camera 13. For example, the CPU 21 transmits a signal instructing the camera 13 to acquire the image, through the camera interface 25. Furthermore, the CPU 21 may set a camera parameter for photographing to the camera 13 through the camera interface 25.

Furthermore, the camera interface 25 acquires the image photographed by the camera 13 (the photographed image). The camera interface 25 transmits the acquired image to the CPU 21. The CPU 21 acquires, from the camera interface 25, the image photographed by the camera 13.

The distance sensor interface 26 is an interface via which the CPU 21 communicates with the distance sensor 14. For example, the distance sensor interface 26 acquires the distance information from the distance sensor 14. For example, the CPU 21 acquires the distance information from the distance sensor interface 26.

Next, functions realized by the CPU 21 will be described.

First, the CPU 21 has a function to acquire the photographed image including the commodity 2 from the camera 13.

For example, the CPU 21 transmits, to the camera 13, a signal to perform the photographing. The CPU 21 acquires the photographed image from the camera 13. Alternatively, to acquire the photographed image, the CPU 21 may set a photographing parameter to the camera 13.

It is to be noted that the CPU 21 may acquire the photographed image from an external device.

Furthermore, the CPU 21 has a function to acquire the distance information from the distance sensor 14.

For example, the CPU 21 transmits, to the distance sensor 14, a signal to measure the distance. The CPU 21 acquires the distance information from the distance sensor 14.

Furthermore, the CPU 21 has a function to extract, from the photographed image, a commodity region in which the commodity (the object) photographs.

For example, the CPU 21 specifies the commodity region based on the photographed image and the distance information. For example, the CPU 21 specifies a position of the commodity information based on the distance information. The region in which the commodity 2 is disposed (the commodity region) comes close to the reference point or the reference plane as much as the height of the commodity. Therefore, the CPU 21 specifies, as the commodity region, a region that is present at a distance shorter than the distance to the screen 12.

Furthermore, the CPU 21 may specify a region that is present at the same distance as the commodity region.

Furthermore, the CPU 21 corrects the commodity region specified based on the distance information, in accordance with the photographed image. For example, the distance sensor 14 cannot measure the distance from the region that is shade of the commodity, and hence edges of the commodity region specified based on the distance information easily blur. Therefore, the CPU 21 corrects the edges of the commodity region based on the photographed image.

It is to be noted that the CPU 21 may perform positioning so that coordinate values of the distance information and the photographed image correspond to each other. For example, the CPU 21 may correct the coordinate value of the distance information or the photographed image from an angle and a viewing field angle of the camera 13, an angle and a measurement region of the distance sensor 14, and the like.

It is to be noted that a method by which the CPU 21 specifies the commodity region is not limited to a specific method.

FIG. 3 illustrates an example of the commodity region specified by the CPU 21.

Figures 3A, 3B:
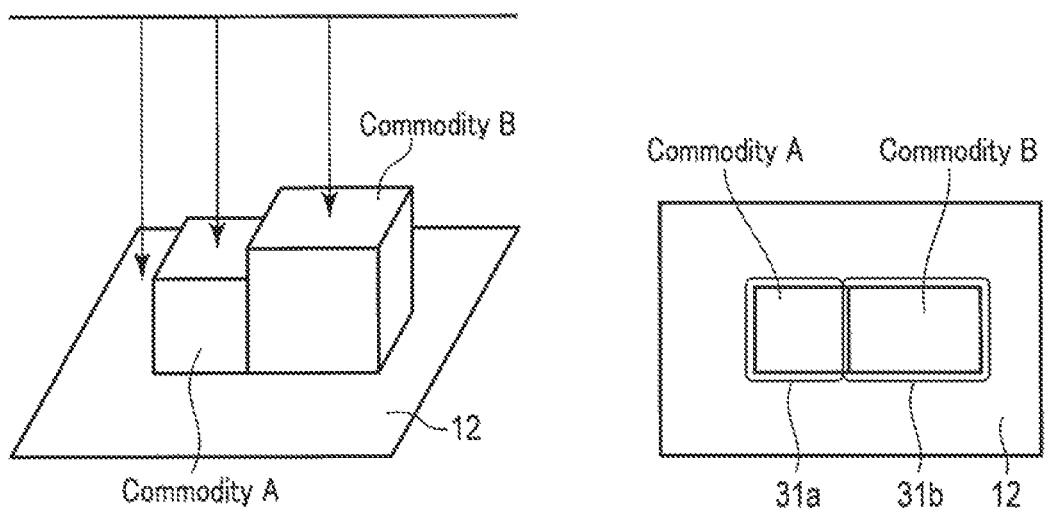
FIG. 3A is a view illustrating an example of a commodity region according to the first embodiment.
FIG. 3B is a view illustrating an example of a commodity region according to the first embodiment.

FIG. 3(a) illustrate a commodity A and a commodity B arranged on the screen 12. A height of the commodity A is lower than a height of the commodity B. Therefore, the CPU 21 can specify the commodity region of the commodity A and the commodity region of the commodity B based on the distance information.

FIG. 3(b) illustrates the commodity regions set on the photographed image. As shown in FIG. 3(b), the CPU 21 sets a commodity region 31a as the commodity region of the commodity A. In addition, the CPU 21 sets a commodity region 31b as the commodity region of the commodity B.

Furthermore, the CPU 21 has a function to specify the commodity from a commodity image.

For example, when the commodity includes identifying information that specifies itself, the CPU 21 specifies the commodity based on the identifying information. For example, the identifying information includes a barcode, an QR code (registered trademark), characters, numerals, marks, and the like. The CPU 21 searches the commodity image for the identifying information, and reads the found identifying information. The CPU 21 acquires the commodity code to indicate the commodity of the commodity image based on read results.

Furthermore, the CPU 21 may specify the commodity by object recognition. For example, the CPU 21 compares the image of each commodity or a characteristic amount of the image which is stored in the NVM 24 or the like with the commodity image or a characteristic amount of the commodity image. The CPU 21 specifies the commodity code of the commodity, in which the image or the characteristic amount of the image matches, as the commodity code indicating the commodity of the commodity image. For example, the characteristic amount is a concentration gradient, a color histogram or the like.

It is to be noted that a method by which the CPU 21 specifies the commodity is not limited to a specific method.

In addition, the CPU 21 has a function to acquire the outer dimension preset in the specified commodity.

For example, the CPU 21 acquires the commodity information including the commodity code of the specified commodity from the NVM 24. The CPU 21 acquires the outer dimension included in the acquired commodity information as the preset outer dimension. It is to be noted that the CPU 21 may acquire the outer dimension of the commodity from the external device.

Furthermore, the CPU 21 has a function to judge whether or not the height of the commodity (a length from the screen 12) in the commodity region matches the outer dimension of the commodity.

For example, the CPU 21 calculates a difference between the distance to the screen 12 and the distance to the commodity region, to calculate the height of the commodity put in the commodity region.

The CPU 21 compares the height with the outer dimension of the commodity. For example, when reading the barcode to specify the commodity, the CPU 21 acquires the height of the commodity from a barcode surface as the outer dimension. The CPU 21 compares the height of the commodity with the height from the barcode surface.

Furthermore, when specifying the commodity by the object recognition, the CPU 21 acquires the height from the surface of the commodity specified by the object recognition, as the outer dimension. The CPU 21 compares the height of the commodity with the height from the surface.

Furthermore, when the height of the commodity and the outer dimension are present in a certain range, the CPU 21 may judge that the height of the commodity matches the outer dimension.

Upon judging that the height of the commodity matches the outer dimension, the CPU 21 judges that recognition of the commodity in the commodity region succeeds.

Furthermore, upon judging that the height of the commodity does not match the outer dimension, the CPU 21 judges that the recognition of the commodity in the commodity region fails.

Upon judging that the height of the commodity does not match the outer dimension, the CPU 21 sets, to the commodity region, an alert flag indicating the failure in the recognition of the commodity.

Figure 4A:
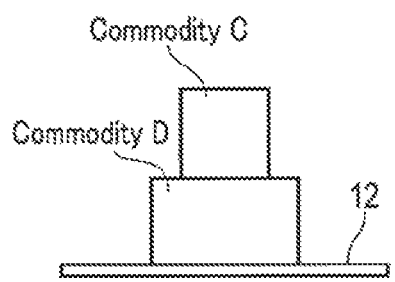
FIG. 4A is a view illustrating an example of stacked commodities according to the first embodiment.
Figure 4B:
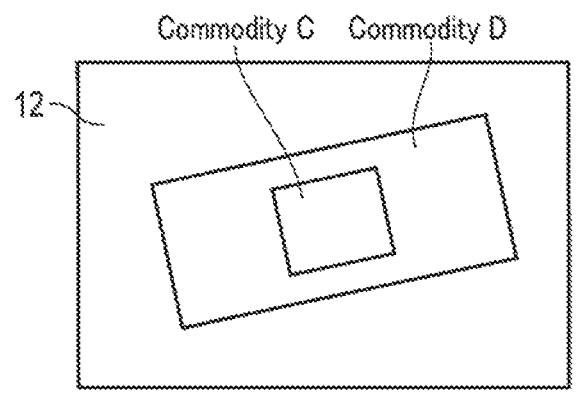
FIG. 4B is a view illustrating an example of stacked commodities according to the first embodiment.

FIG. 4 is a view to explain an example in which the height of the commodity does not match the outer dimension.

FIG. 4(*a*) illustrates a commodity C and a commodity D stacked on the screen 12. In the example shown in FIG. 4(*a*), the commodity C is stacked on the commodity D.

FIG. 4(*b*) illustrates an example of the distance information. Here, the distance information is a distance image. As shown in FIG. 4(*b*), a height of a region in which the commodity C is present is larger than that of the commodity D. Furthermore, the photographed image is an image from the downside, and therefore includes the commodity D. Therefore, the CPU 21 specifies the commodity D from the photographed image.

The CPU 21 compares an outer dimension of the commodity D with a height of a commodity region of the commodity D. The commodity C is stacked on the commodity D, and hence the height of the commodity region is larger than the outer dimension of the commodity D. Therefore, the CPU 21 judges that the height of the commodity in the commodity region does not match the outer dimension of the specified commodity.

Furthermore, the CPU 21 has a function to display the commodity region of success in specifying the commodity and the commodity region of failure in recognition of the commodity (the commodity region to which the alert flag is set).

For example, the CPU 21 displays the photographed image in a predetermined region of the display 15. The CPU 21 displays, on the photographed image, a solid line frame (information indicating success in reading) around the commodity region of the success in the recognition of the commodity. That is, the CPU 21 displays the solid line frame around the commodity region of the success in the recognition of the commodity, whereby the success in the recognition of the commodity in the commodity region is indicated.

Furthermore, the CPU 21 displays, on the photographed image, a broken line frame (information indicating the recognition failure) around the commodity region of the failure in the recognition of the commodity. That is, the CPU 21 displays the broken line frame around the commodity region of the failure in the recognition of the commodity, whereby the failure in the recognition of the commodity in the commodity region is indicated.

It is to be noted that a method by which the CPU 21 displays the commodity region of the success in specifying the commodity and the commodity region of the failure in the recognition of the commodity is not limited to a specific method.

Next, there will be described a display example of the display 15 when the CPU 21 fails in the recognition of the commodity in parts of the commodity regions.

Figure 5:
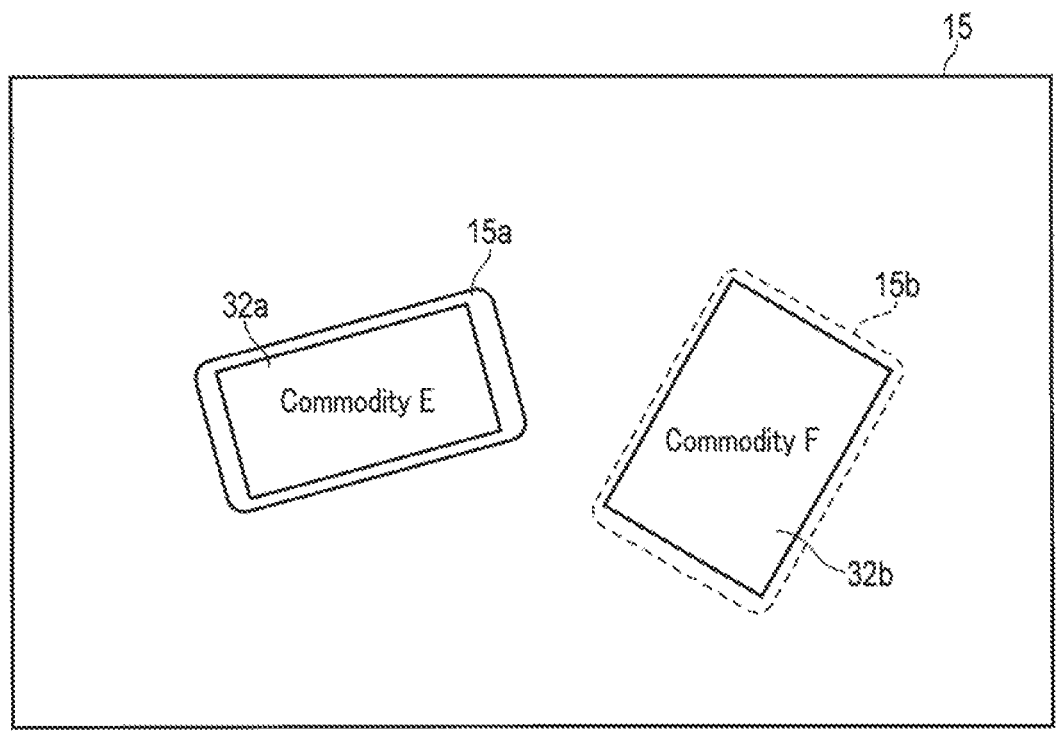
FIG. 5 is a view illustrating a display example of the settlement apparatus according to the first embodiment.

FIG. 5 illustrates a display example (an output image) of the display 15 when the CPU 21 fails in the recognition of the commodity in the parts of the commodity regions. Here, the commodity image reflects a commodity E and a commodity F. Furthermore, the CPU 21 sets commodity regions 32*a* and 32*b* to a region in which the commodity E photographs and a region in which the commodity F photographs, respectively.

As shown in FIG. 5, the CPU 21 displays a solid line frame 15*a* and a broken line frame 15*b* in the display 15.

The solid line frame 15*a* surrounds the commodity region 32*a* of the commodity E. Therefore, the CPU 21 indicates the success in the recognition of the commodity in the commodity region 32*a* of the commodity E.

The broken line frame 15*b* surrounds the commodity region 32*b* of the commodity F. Therefore, the CPU 21 indicates the failure in the recognition of the commodity in the commodity region 32*b* of the commodity F.

Furthermore, the CPU 21 has a function to settle payment of the commodity when succeeding in the recognition of the commodity in each commodity region.

For example, the CPU 21 acquires the price from the commodity information of the recognized commodity. The CPU 21 adds up the prices of the respective commodities to calculate the payment of the commodities.

Furthermore, the CPU 21 acquires the credit information of a purchaser who purchases the commodity. For example, the CPU 21 may accept input of the credit information from the card of the purchaser through the card reader 17. Furthermore, the CPU 21 may acquire an image of the purchaser by use of the camera or the like and acquire the credit information corresponding to the image.

The CPU 21 settles the payment of the commodities based on the acquired credit information. For example, the CPU 21 transmits the credit information and the payment of the commodities to a credit server or the like.

It is to be noted that the CPU 21 may include a cash processing section or the like and receive cash from the purchaser. Furthermore, the CPU 21 may acquire the SF information from the card and settle the payment of the commodities based on the SF information.

Furthermore, the CPU 21 has a function to output an alert when there is a commodity region of the failure in the recognition of the commodity (the commodity region to which the alert flag is set).

For example, the CPU 21 outputs, to an external device, the alert indicating the failure in the recognition of the commodity. Furthermore, the CPU 21 may include a speaker or the like, and output the alert in voice. Furthermore, the CPU 21 may output an alert indicating the commodity region of the failure in the recognition of the commodity. In addition, the CPU 21 may transmit, to the external device, information indicating that there is the commodity region of the failure in the recognition of the commodity. The alert output by the CPU 21 is not limited to a specific constitution.

Next, an operation example of the CPU 21 will be described.

Figure 6:
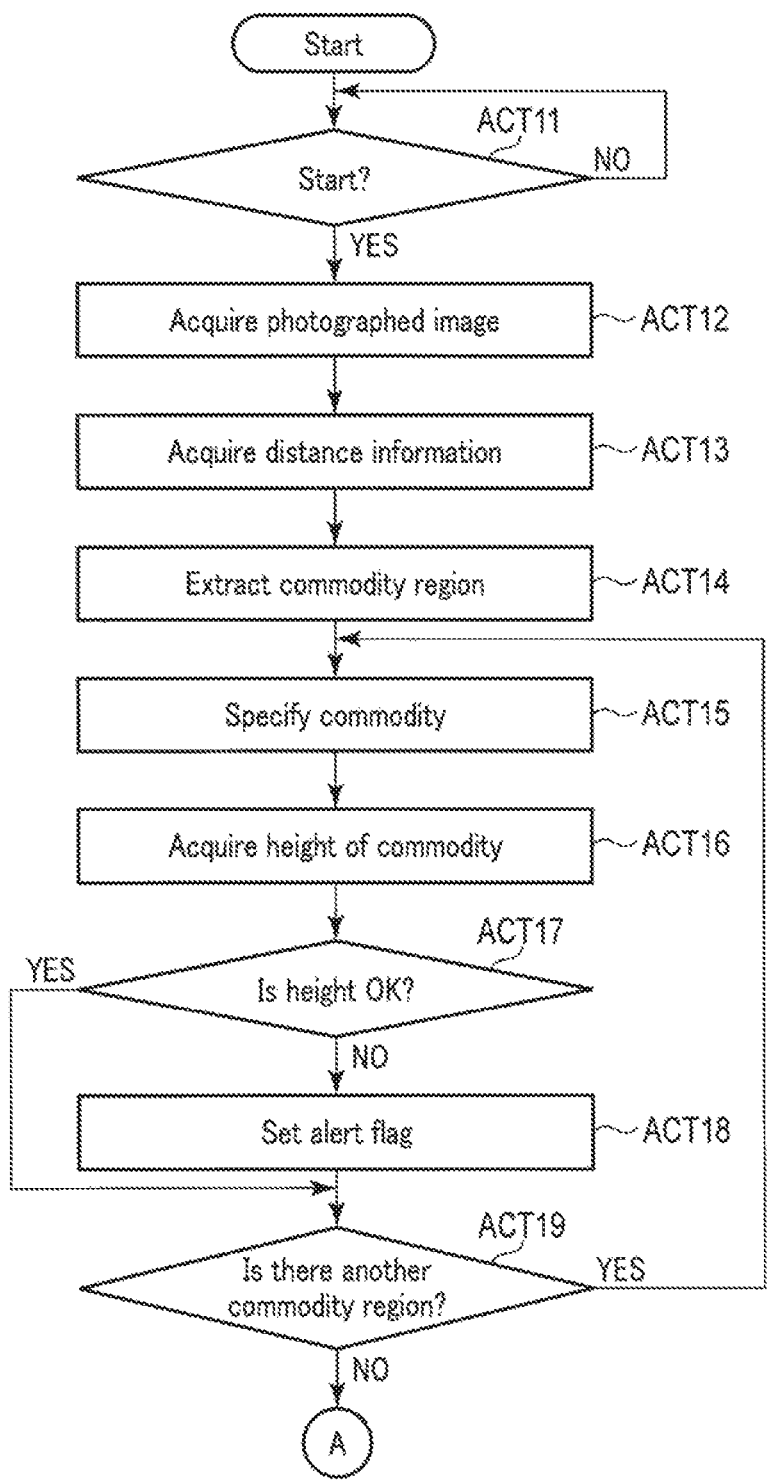
FIG. 6 is a flowchart illustrating an operation example of the settlement apparatus according to the first embodiment.
Figure 7:
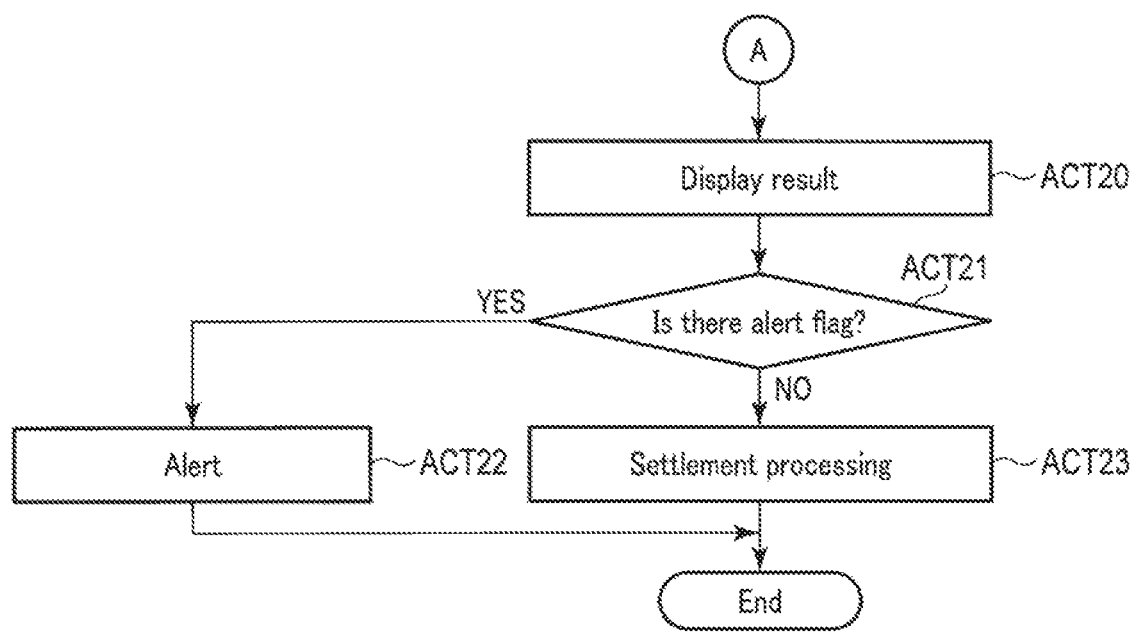
FIG. 7 is a flowchart illustrating an operation example of the settlement apparatus according to the first embodiment.

FIGS. 6 and 7 show flowcharts to explain the operation example of the CPU 21.

First, the CPU 21 judges whether or note commodity recognition processing is started (ACT11). For example, the CPU 21 judges whether or not an operation of starting the commodity recognition processing is accepted through the operating section 16. Furthermore, the CPU 21 may judge whether or not the commodities are put on the screen 12. Upon judging that the commodity recognition processing does not start (ACT11, NO), the CPU 21 returns to ACT11.

Upon judging that the commodity recognition processing starts (ACT11, YES), the CPU 21 acquires the photographed image through the camera 13 (ACT12). Upon acquiring the photographed image, the CPU 21 acquires distance information through the distance sensor 14 (ACT13).

Upon acquiring the distance information, the CPU 21 extracts the commodity region from the photographed image (ACT14). Upon extracting the commodity region, the CPU 21 specifies the commodity from one commodity region (ACT15).

Upon specifying the commodity, the CPU 21 acquires an outer dimension of the specified commodity (ACT16). Upon acquiring the outer dimension, the CPU 21 judges whether or not the height of the commodity region matches the outer dimension of the commodity (ACT17).

Upon judging that the height of the commodity region does not match the outer dimension of the commodity (ACT17, NO), the CPU 21 sets the alert flag to the commodity region (ACT18).

When it is judged that the height of the commodity region matches the outer dimension of the commodity (ACT17, YES) or when the alert flag is set to the commodity region (ACT18), the CPU 21 judges whether or not there is another commodity region in which the commodity is not specified (ACT19).

Upon judging that there is the other commodity region in which the commodity is not specified (ACT19, YES), the CPU 21 returns to ACT15.

Upon judging that there is not any commodity region in which the commodity is not specified (ACT19, NO), the CPU 21 displays, in the display 15, the commodity region of the success in specifying the commodity and the commodity region of the failure in specifying the commodity (ACT20).

Upon displaying both the commodity regions, the CPU 21 judges whether or not there is the commodity region to which the alert flag is set (ACT21). Upon judging that there is the commodity region to which the alert flag is set (ACT21, YES), the CPU 21 outputs the alert (ACT22).

Upon judging that there is not any commodity region to which the alert flag is set (ACT21, NO), the CPU 21 performs the settlement processing (ACT23). It is to be noted that the CPU 21 may perform the settlement processing when accepting an operation of performing the settlement processing through the operating section 16.

When the alert is output (ACT22) or when the settlement processing is performed (ACT23), the CPU 21 ends the operation.

It is to be noted that the CPU 21 may perform ACT13 and then perform ACT12. Furthermore, the CPU 21 may simultaneously perform ACT12 and ACT13 in parallel.

Furthermore, the CPU 21 may set the alert flag to the commodity region, in the failure in specifying the commodity from the commodity region in ACT15.

Furthermore, the CPU 21 may display, in the display 15, a message or the like to require renewal putting of the commodity when there is the commodity region to which the alert flag is set. In this case, the CPU 21 may execute ACT12 and later again.

The settlement apparatus having the above-mentioned constitution photographs the commodities on the screen from the downside with the camera. Therefore, as compared with photographing of commodities having different shapes from the upside, it is easier for the settlement apparatus to focus the camera on the surface to be photographed of each commodity on the screen. Therefore, in the settlement apparatus, a depth of field of the camera may be small, and a photographing distance can be decreased to photograph the commodities with a sufficiently high resolution. As a result, it is possible to miniaturize the settlement apparatus.

Furthermore, the settlement apparatus extracts the commodity region based on the photographed image and the distance information. Therefore, the settlement apparatus can extract regions having different heights as different commodity regions. As a result, the settlement apparatus can specify the commodity region of each commodity even when the commodities are put adjacent to one another on the screen.

Furthermore, the settlement apparatus compares the height of the commodity region with the outer dimension of the commodity specified from the commodity region. When the height and the outer dimension do not match each other, the settlement apparatus judges that the recognition of the commodity in the commodity region fails. Therefore, the settlement apparatus can judge the failure in the recognition of the commodity when the commodities are stacked. As a result, the settlement apparatus can prevent wrongful settlement processing.

Furthermore, in the settlement apparatus, the camera is disposed at the position to face the distance sensor via the screen. As a result, in the settlement apparatus, the photographed image acquired from the camera can easily match the distance information acquired from the distance sensor. For example, in the settlement apparatus, matching of the photographed image and the distance information is possible without performing coordinate transformation such as affine transformation.

(Second Embodiment)

Next, a settlement apparatus according to a second embodiment will be described.

A settlement apparatus 1' according to the second embodiment is different from the settlement apparatus 1 according to the first embodiment in that the settlement apparatus includes an illumination and a reflector. Therefore, the same constitution is denoted with the same reference signs to omit detailed description thereof.

Figure 8:
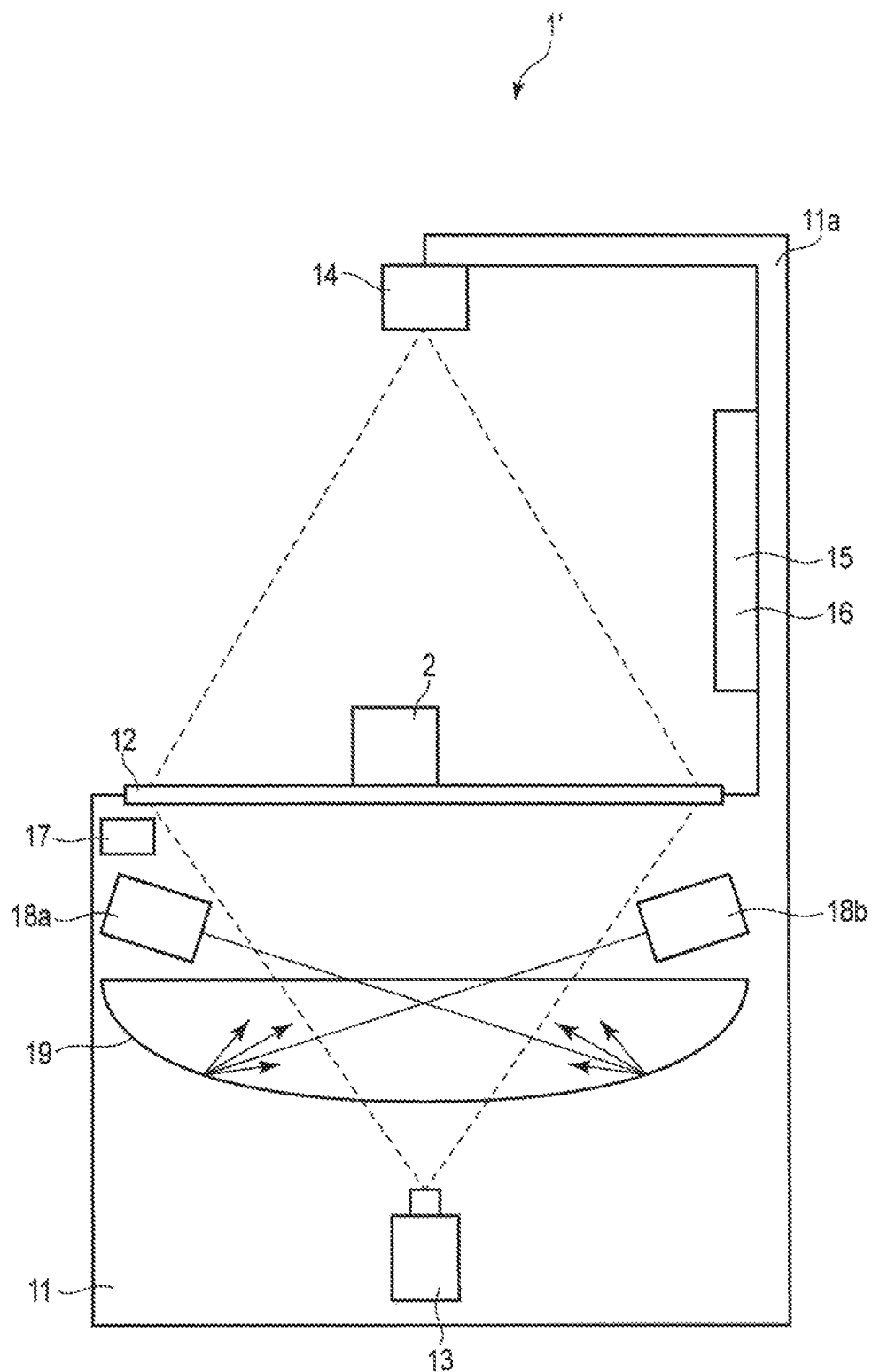
FIG. 8 is a view schematically illustrating a constitutional example of a settlement apparatus according to a second embodiment.

FIG. 8 schematically illustrates a constitutional example of the settlement apparatus 1' according to the second embodiment.

As shown in FIG. 8, the settlement apparatus 1' further includes an illumination 18, a reflector 19 and the like.

The illumination 18 emits light to adjust, into sufficient illuminance, the surface of a commodity to be photographed by a camera 13. Here, the illumination 18 is constituted of an illumination 18a and an illumination 18b.

The illumination 18 is arranged so that the light does not directly enter the surface to be photographed of a commodity 2 to avoid gloss reflection by emitted illumination light.

As shown in FIG. 8, the illumination 18 is disposed to emit the light to a reflector 19 side. The illumination 18 may emit visible light or invisible light. Furthermore, the illumination 18 may emit the visible light and the invisible light.

The reflector 19 guides the light from the illumination 18 to the surface to be photographed of the commodity on the screen 12. The reflector 19 is, for example, a reflecting diffuser. In the example shown in FIG. 8, the reflector 19 is formed into a bowl shape opened on a screen 12 side. The reflector 19 is disposed under the screen 12 (another surface side). The reflector 19 reflects the light from the illumination 18 to irradiate the screen 12 from the downside of the screen 12. The surface to be photographed of the commodity 2 on the screen 12 is irradiated with the light (the illumination light) emitted by the illumination 18 via the reflector 19. That is, the surface to be photographed of the commodity 2 is illuminated through the screen 12 with the reflected light as diffused illumination light from the reflector 19.

The illumination 18 and the reflector 19 are attached not to interrupt a photographing viewing field of the camera 13.

Next, a constitutional example of a control system of the settlement apparatus 1' will be described.

Figure 9:
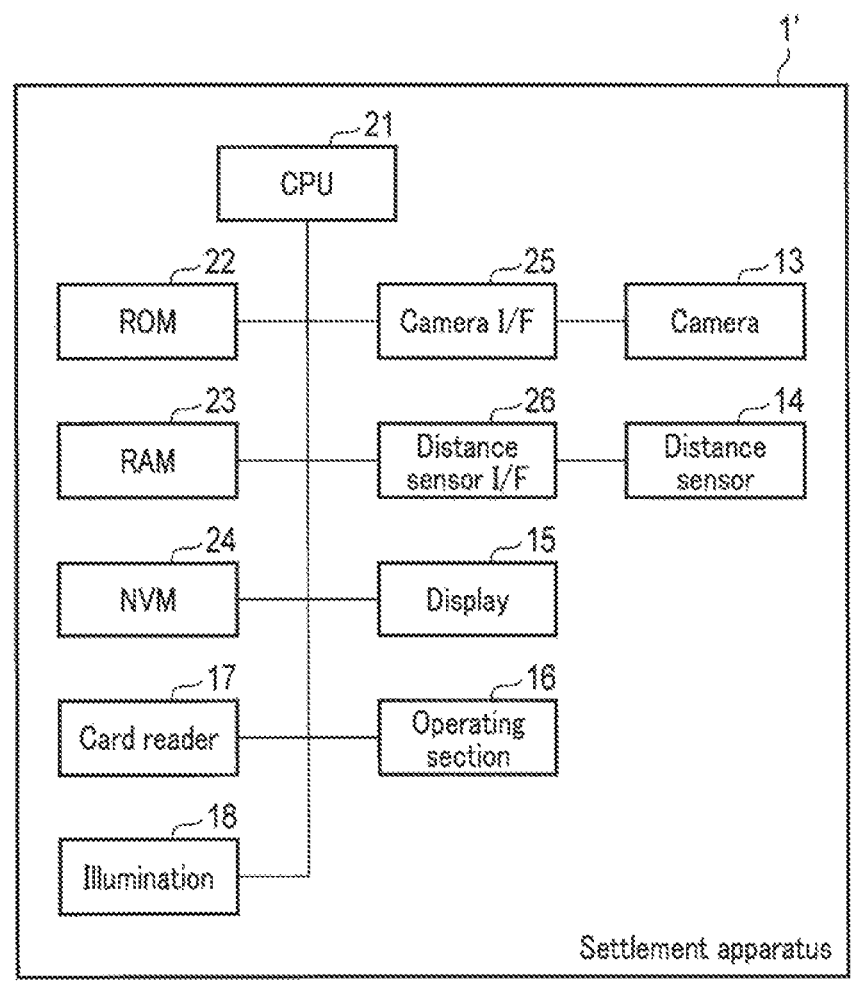
FIG. 9 is a block diagram illustrating the constitutional example of the settlement apparatus according to the second embodiment.

FIG. 9 is a block diagram illustrating the constitutional example of the control system of the settlement apparatus 1'.

As shown in FIG. 9, the settlement apparatus 1' further includes the illumination 18. The illumination 18 is connected to a CPU 21 via a data bus.

The CPU 21 turns on the illumination 18 when the camera 13 photographs an image. For example, the CPU 21 turns on the illumination 18 at a predetermined timing. The CPU 21 allows the camera 13 to photograph the image while the illumination 18 is on. It is to be noted that the CPU 21 may turn off the illumination 18 at a timing for a distance sensor 14 to measure a distance.

Furthermore, the light (the illumination light) emitted from the illumination 18 is reflected by the reflector 19 to illuminate the screen 12. The illumination light reflected by the reflector 19 is oriented to the upside through the screen 12 in a portion in which the commodity 2 is not disposed. Consequently, when the illumination light is visible light such as white light, there is the possibility that a user who operates the settlement apparatus 1' feels the screen 12 to be dazzling. Consequently, the illumination 18 may use, as the illumination light, light (invisible light) out of a wavelength region of the visible light. For example, the illumination 18 uses a near infrared ray of 700 nm or more as the illumination light. When the illumination light emitted from the illumination 18 is the near infrared ray, even if directly looking at the illumination light, the user does not feel dazzled.

When the illumination 18 irradiates the invisible light, the screen 12 may include a filter that does not transmit the visible light. Furthermore, the camera 13 photographs the image by use of the invisible light. Due to the film, the camera 13 is hard to be influenced by the visible light from the outside. As a result, in a photographed image, a subject surface of the commodity becomes bright, and a region other than the commodity becomes comparatively dark. Therefore, the CPU 21 can easily extract a commodity region from the photographed image.

Furthermore, in the illumination 18, a substance through which the invisible light passes is different from a substance through which the visible light passes, and hence it is also considered that characteristics of the image are different and hence a recognition accuracy is influenced. For example, the illumination 18 may be constituted to irradiate the visible light and the invisible light. The camera 13 photographs the image by use of the visible light and the invisible light.

The CPU 21 may specify the commodity region from the photographed image acquired by using the invisible light, and may further specify an image region of each commodity by use of the photographed image acquired with visible light illumination. When the commodity region of each commodity is extracted in the above-mentioned system, an accuracy of pixels in the vicinity of edges of the commodity becomes especially higher as compared with the extraction of the commodity region from the distance information as in the first embodiment. Therefore, the CPU 21 may collate the respective commodity regions acquired by using both the invisible light and the visible light, to perform position correction or the like.

In the settlement apparatus having the above-mentioned constitution, the surface to be photographed of the commodity is illuminated with the illumination from the downside of the screen. As a result, the settlement apparatus can acquire the photographed image of the sufficient illuminance. Therefore, the settlement apparatus can accurately extract the commodity region and specify the commodity.

REFERENCE SIGNS LIST

1 . . . settlement apparatus, 11 . . . case, 12 . . . screen, 13 . . . camera, 14 . . . distance sensor, 15 . . . display, 16 . . . operating section, 18 . . . illumination, 19 . . . reflector, 21 . . . CPU, 25 . . . camera interface, and 26 . . . distance sensor interface.

The invention claimed is:

1. An image processing apparatus comprising:
a screen on one surface of which an object is put;
a camera that photographs an image as a photographed image from the other surface of the screen;
a distance sensor that measures a distance to the one surface of the screen from the distance sensor and generates distance information indicating the measured distance; and
a processor that extracts a region of the object from the photographed image,
specifies the object from the image of the region of the object,
acquires an outer dimension of the specified object,
calculates a height, from the screen, of the object put on the one surface of the screen based on the measured distance and a distance measured from the distance sensor to a top surface of the object, and
outputs an alert when the outer dimension does not match the height of the object.

2. The image processing apparatus according to claim 1, wherein the processor outputs an output image including the image of the region of the object and information indicating failure in recognition of the object, when the outer dimension does not match the height of the object.

3. The image processing apparatus according to claim 1, wherein the processor extracts the region of the objects based on the distance information.

4. The image processing apparatus according to claim 1, wherein the object is a commodity.

5. The image processing apparatus according to claim 4, wherein the processor settles payment of the object, when the outer dimension matches the height of the object.

6. The image processing apparatus according to claim 1, comprising:

a storing section in which the object and the outer dimension are associated and stored, wherein the processor acquires the outer dimension preset to the specified object from the storing section.

7. The image processing apparatus according to claim 1, wherein the distance sensor is disposed at a position to face a position of the camera via a center of the screen.

8. The image processing apparatus according to claim 1, comprising:

an illumination that emits light; and a reflector that reflects the light from the illumination to irradiate the screen from the other surface side of the screen.

9. The image processing apparatus according to claim 8, wherein the illumination emits invisible light, and the camera photographs the image with the invisible light.

10. An image processing method comprising:

photographing an image of an object put on one surface of a screen as a photographed image from the other surface of the screen;

measuring a distance from a distance sensor to the one surface of the screen and generating distance information indicating the measured distance;

extracting a region of the object from the photographed image;

specifying the object from the image of the region of the object;

acquiring an outer dimension of the specified object;

calculating a height, from the screen, of the object put on the one surface of the screen based on the measured distance and a distance measured from the distance sensor to a top surface of the object; and outputting an alert when the outer dimension does not match the height of the object.

11. The image processing method according to claim 10, further comprising:

outputting an output image including the image of the region of the object and information indicating failure in recognition of the object, when the outer dimension does not match the height of the object.

12. The image processing method according to claim 10, further comprising:

extracting the region of the objects based on the distance information.

13. The image processing method according to claim 10, wherein the object is a commodity.

14. The image processing method according to claim 13, further comprising:

settling payment of the object, when the outer dimension matches the height of the object.

15. The image processing method according to claim 10, further comprising:

acquiring the outer dimension preset to the specified object from a storing section in which the object and the outer dimension are associated and stored.

16. The image processing method according to claim 10, wherein the distance sensor is disposed at a position to face a position of a camera that photographs the image via a center of the screen.

17. The image processing method according to claim 10, further comprising:

emitting light; and reflecting the light to irradiate the screen from the other surface side of the screen.

18. The image processing method according to claim 17, further comprising:

emitting invisible light, and photographing the image with the invisible light.

* * * * *